(12) United States Patent
Epskamp et al.

(10) Patent No.: US 12,738,804 B2
(45) Date of Patent: Sep. 15, 2026

(54) DRIVE SYSTEM

(71) Applicant: SEW-EURODRIVE GMBH & CO. KG, Bruchsal (DE)

(72) Inventors: Torsten Epskamp, Bretten (DE); Frank Hartmann, St. Leon Rot (DE); Alexander Stahl, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 276 days.

(21) Appl. No.: 18/834,075

(22) PCT Filed: Dec. 19, 2022

(86) PCT No.: PCT/EP2022/086764
§ 371 (c)(1),
(2) Date: Jul. 29, 2024

(87) PCT Pub. No.: WO2023/143819
PCT Pub. Date: Aug. 3, 2023

(65) Prior Publication Data
US 2025/0105699 A1 Mar. 27, 2025

(30) Foreign Application Priority Data
Jan. 27, 2022 (DE) ......................... 102022000316.3

(51) Int. Cl.
*H02K 7/10* (2006.01)
*H02K 7/102* (2006.01)
(Continued)

(52) U.S. Cl.
CPC ......... *H02K 7/1025* (2013.01); *H02K 11/215* (2016.01); *H02K 11/35* (2016.01); *H02K 2211/03* (2013.01)

(58) Field of Classification Search
CPC .... H02K 7/1025; H02K 11/215; H02K 11/35; H02K 2211/03
See application file for complete search history.

(56) References Cited

U.S. PATENT DOCUMENTS 7,447,035 B2 11/2008 Liu
2004/0239196 A1 12/2004 Miura

FOREIGN PATENT DOCUMENTS

DE 202007012798 U1 2/2009
DE 102008019797 A1 10/2009
(Continued)

OTHER PUBLICATIONS

International Report on Patentability issued in corresponding International Application No. PCT/EP2022/086764, dated Jul. 30, 2024, pp. 1-9, English Translation.
(Continued)

*Primary Examiner* — Terrance L Kenerly
(74) *Attorney, Agent, or Firm* — Carter, DeLuca & Farrell LLP

(57) ABSTRACT

An electric motor includes an angle sensor, and the angle sensor includes a main body, a hood part, a holding part, a first circuit board, an intermediate flange, a second circuit board, a disk part, e.g., with a dimensional scale, and a hollow shaft. The rotor shaft of the angle sensor is connected to a rotor of the electric motor for conjoint rotation, and the disk part is slid onto the hollow shaft and bears against a shaft step and/or a flat surface region of the hollow shaft. The second circuit board has conducting tracks acting and/or formed as coil winding and is held clamped between the main body and the intermediate flange, and the intermediate flange is pressed towards the main body by the screw head of another screw screwed into a threaded bore of the main body. The first circuit board is held clamped between the intermediate flange and the holding part, and the screw head
(Continued)

of a screw screwed into a threaded bore of the intermediate flange presses the holding part towards the intermediate flange. An elastically preloaded sheet-metal part supported on the hood part is disposed between the holding part and the hood part.

23 Claims, 1 Drawing Sheet

(51) Int. Cl.
*H02K 11/215* (2016.01)
*H02K 11/35* (2016.01)

(56) References Cited

FOREIGN PATENT DOCUMENTS

| | | | |
|---|---|---|---|
| DE | 102018204297 | A1 | 9/2019 |
| DE | 102020006900 | A1 | 6/2021 |
| EP | 2689530 | B1 | 11/2017 |
| JP | 2003337051 | A | 11/2003 |
| WO | 2014163293 | A1 | 10/2014 |

OTHER PUBLICATIONS

International Search Report and Written Opinion issued in corresponding International Application No. PCT/EP2022/086764 dated Apr. 3, 2023, pp. 1-10, English Translation.

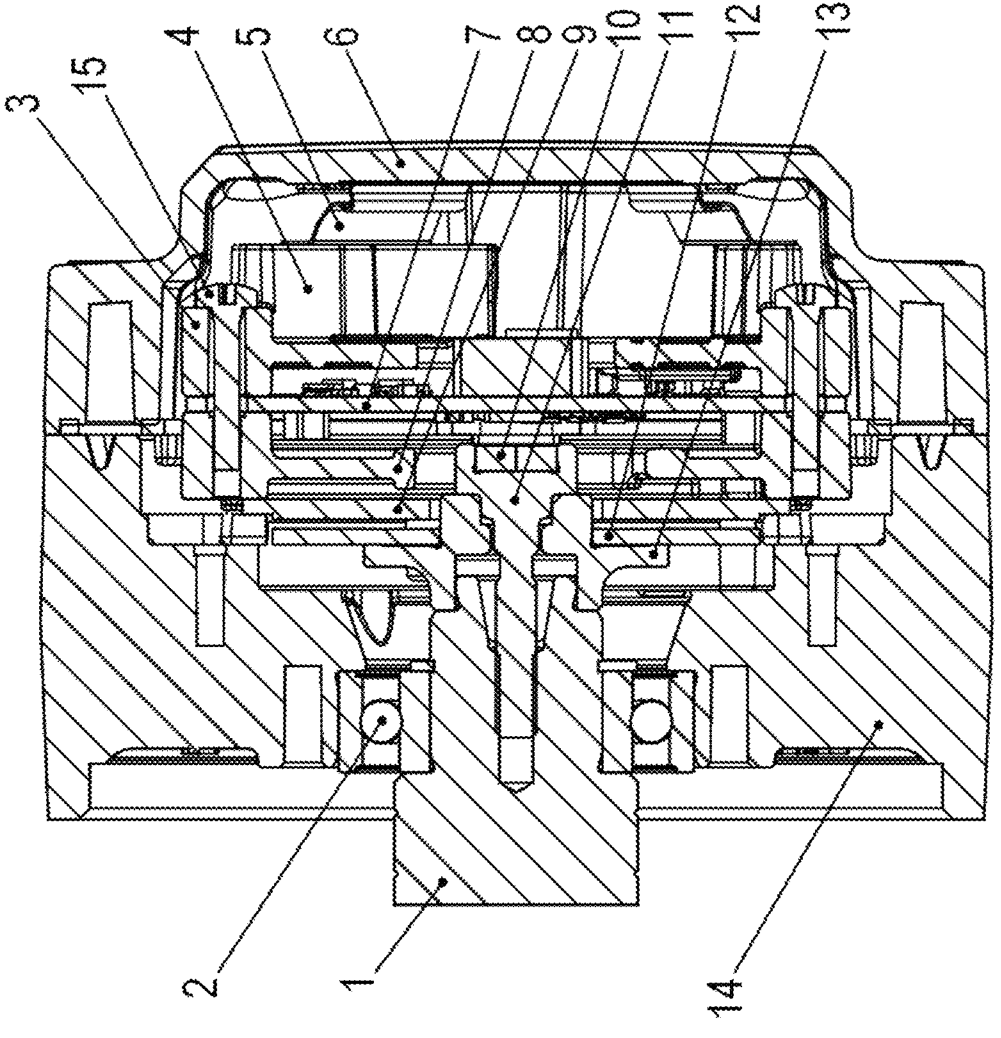
3
15
4
5
6
7
8
9
10
11
12
13
2
1
14

DRIVE SYSTEM

FIELD OF THE INVENTION

The present invention relates to a drive system.

BACKGROUND INFORMATION

In certain conventional systems, an electric motor has a rotor that passes through different angular positions during operation.

A brake arrangement with a shaft is described in German Patent Document No. 10 2020 006 900.

A drive system is described in European Patent Document no. 2 689 530.

A cooling arrangement is described in German Patent Document No. 10 2008 019 797.

A heat dissipation arrangement is described in U.S. Pat. No. 7,447,035.

An electric drive unit with at least two printed circuit boards is described in German Patent Document No. 10 2018 204 297.

A hollow shaft with an angle sensor is described in Japanese Patent Document No. 2003-337051.

A motor with simple assembling sensor magnet is described in PCT Patent Document No. WO 2014/163293.

SUMMARY

Example embodiments of the present invention provide a drive system having a compact configuration.

According to example embodiments, a drive system includes an electric motor with an angle sensor and an inverter, e.g., a converter, which feeds the electric motor. The angle sensor includes, e.g., at least partially encloses with its housing: a rotor shaft, an electronic circuit, signal electronics with a first circuit board and data interface, a second circuit board, a disk part, in particular with a dimensional scale, and a hollow shaft. The rotor shaft of the angle sensor is connected for conjoint rotation with a rotor of the electric motor, e.g., arranged in one piece with the rotor. For example, the angle sensor is disposed within the housing of the electric motor. The disk part is connected with the hollow shaft for conjoint rotation. The second circuit board has conducting tracks acting and/or formed as coil winding, e.g., which are in operative connection with the dimensional scale of the disk part. The electric motor has an electromagnetically actuated brake which has a coil which is connected to the electronic circuit via an electrical cable, and the electronic circuit is adapted to supply and/or feed the coil electrically depending on a control signal, e.g., depending on control information. The signal electronics have a filter, e.g., on the first circuit board, which is adapted to filter out the control signal, e.g., the control information, from the data transmitted from the inverter to the signal electronics via the data interface and feed it to the electronic circuit. The data interface for bidirectional data transmission is adapted to transmit the values of the angular position of the rotor shaft captured by the angle sensor from the signal electronics, e.g., from the first circuit board, to the inverter.

Thus, the signal electronics are used as a data node. On the one hand, the captured angle values are transmitted from the signal electronics to the inverter and, on the other hand, the control information for the brake is generated in the inverter. This is done depending on the diagnostic information which is transmitted to the inverter by the diagnostic device of the brake via the electronic circuit and the data interface of the signal electronics. For example, thus, only a single data transmission channel is required from the inverter to the motor, e.g., up to the data interface. The various components of the motor, e.g., the brake and the angle sensor, are thus available via a single data cable for data transmission. The electric motor is supplied by the inverter via high-voltage cables, with which the inverter provides the electric motor, e.g., the stator winding of the electric motor, with a three-phase voltage.

For example, the speed of the electric motor or the torque provided by the electric motor can be regulated to a setpoint by the inverter. The brake is also controlled by the inverter, and the brake is released or applied depending on the diagnostic information. However, this control is not carried out directly, but via the signal electronics, e.g., data interface, acting as a data node.

In addition, the electronic interface is not disposed in the junction box of the motor or elsewhere, but in the housing of the angle sensor. Thus, the low-voltage electronics can be disposed in the angle sensor and the power electronics in the motor.

Additionally, the data transmission between the inverter and the data node can be carried out via only one data interface, i.e., via only one data transmission channel, and thus no separate additional cables are required for the control of the brake, as the same cables via which the angle information is transmitted can also be used for the transmission of the diagnostic information and the control information of the brake. The drive system can thus be arranged compactly, since additional necessary hardware together with the separate additional cables are no longer required.

According to example embodiments, the angle sensor includes a main body, a hood part, a holding part, and an intermediate flange. The disc part is slid onto the hollow shaft, e.g., is slid on without play for centering in the radial direction, and bears against a shaft step and/or a flat surface region of the hollow shaft, e.g., which region is disposed at a single axial position. The second circuit board has conducting tracks acting and/or formed as coil winding and is held clamped between the main body and the intermediate flange, for example. The intermediate flange is pressed towards the main body by the screw head of another screw screwed into a threaded bore of the main body. The first circuit board is held clamped between the intermediate flange and the holding part, for example. The screw head of a screw screwed into a threaded bore of the intermediate flange presses the holding part towards the intermediate flange, and an elastically preloaded sheet-metal part supported on the hood part is disposed between the holding part and the hood part. Thus, the angle sensor has a stacked configuration. Thus, improved cooling can be achieved, since the intermediate flange and holding part between the circuit boards conduct the heat out. The stack is stacked in the axial direction, e.g., so that the stacking direction is parallel to the axial direction. The stack includes, on the one hand, the circuit boards, and, on the other hand, the holding part and the intermediate flange, e.g., as well as an optional additional electronic circuit.

The up to three electrically energizable stacking parts are separated from each other via the, e.g., metallic, stacking parts, i.e., holding part and intermediate flange. This allows for improved cooling and electromagnetic shielding as well as a compact configuration.

The holding part and the intermediate flange are, e.g., formed such that the circuit boards are respectively disposed in a spatial region which is delimited and surrounded by the intermediate flange together with the holding part or by the intermediate flange together with the main body or by the holding part together with the hood part. For this purpose, each of the two parts is axially thickened in a first radially outer region.

According to example embodiments, the brake includes at least one diagnostic device adapted to capture the value of at least one state variable of the brake. The diagnostic device is electrically connected to the electronic circuit such that the captured values are transmitted from the diagnostic device to the electronic circuit, and the electronic circuit is connected to the signal electronics, e.g., to the first circuit board, such that the captured values are forwarded from the electronic circuit to the signal electronics and from its data interface to the inverter. For example, the inverter is arranged such that the control signal, e.g., the control information, is generated depending on the values captured by the diagnostic device. For example, the state variable is the temperature of the brake or the wear condition of a brake pad of the brake. For example, the diagnostic device is a temperature sensor or a sensor for capturing the wear of a brake pad of the brake. Thus, the brake is only controlled if the diagnostic information allows this. For this purpose, the diagnostic information is transmitted via the data node and taken into account when generating the control information for the brake, thus, e.g., in the inverter. Improved safety can thus be achieved and the signal electronics do not have to have any complex evaluation equipment, which means they only require a small installation volume. The drive system can thus be configured compactly. The computing power of the inverter, e.g., of the control electronics of the inverter, is sufficient so that no additional hardware is required to process the diagnostic information and generate the control pulses.

According to example embodiments, the electric motor has an electromagnetically actuated brake, which has a coil which is suppliable from an electronic circuit which feeds the coil depending on a control signal. The control signal is fed from the first circuit board to the electronic circuit, and the electronic circuit is disposed on the side of the holding part facing away from the first circuit board, e.g., between the hood part and the holding part. The sheet-metal part is supported on the electronic circuit, i.e., for example, is disposed elastically preloaded between the electronic circuit and the hood part. For example, the sheet-metal part is arranged as a bent part. Thus, the signal electronics of the first circuit board are not only provided for detecting the angular position, but also for generating the control pulses for the brake, and the supply voltage for the brake is generated and controlled in the angle sensor and fed to the brake disposed in the electric motor at a distance from the angle sensor.

According to example embodiments, the rotor is rotatably mounted via two bearings accommodated in the housing of the electric motor. For example, the housing has a stator housing and two bearing flanges spaced apart from one another, each connected to the stator housing, in each of which one of the two bearings is accommodated. Thus, the rotor itself is rotatably mounted independently of the hollow shaft of the angle sensor.

According to example embodiments, the screw head of a first screw screwed into a threaded hole in the rotor shaft presses the hollow shaft against the rotor shaft, and a permanent magnet is accommodated in the screw head, e.g., the center of gravity of which is disposed in the axis of rotation of the hollow shaft. Thus, the total number of rotations completed by the rotor part can be captured.

According to example embodiments, the first circuit board includes a magnetic field-sensitive sensor, e.g., a pulse wire sensor and/or a Wiegand sensor, which is in operative connection with the permanent magnet. For example, a counter mounted on the first circuit board for determining the number of rotations of the rotor shaft can be electrically supplied by the sensor. Thus, even if the power supply fails, the counter is suppliable with energy from the pulses themselves. Capturing the full rotations completed is thus possible and can be carried out at any time.

According to example embodiments, the conducting tracks of the second circuit board, which are formed as coil windings, are in operative connection with the dimensional scale of the disk part and the signal electronics of the first circuit board are electrically connected to the coil windings and are adapted to determine the angular position of the disk part in relation to the second circuit board.

According to example embodiments, the disk part covers a first radial distance region, e.g., in relation to the axis of rotation of the rotor shaft, and the hollow part has an axially greater thickness radially outside the first radial distance region than in the first radial distance region. Thus, the disc part has a dimensional scale and is precisely centered and aligned. This is because centering takes place on the shaft journal, e.g., the dome section, of the hollow shaft.

According to example embodiments, the intermediate flange has an axially greater thickness radially outside the first radial distance region than in the first radial distance region.

Thus, the electronic components of the first circuit board can be disposed in the first radial distance region, where they are shielded and surrounded in a housing-forming manner.

According to example embodiments, the electronic circuit is cast using casting compound and/or is disposed in a housing. Thus, the sheet-metal part can be readily supported and at an insulating distance.

According to example embodiments, the first circuit board is disposed clamped between the hollow part and the intermediate flange, e.g., outside the first radial distance region. Thus, the first circuit board is held mechanically stable and the electronic components disposed on the first circuit board are protected from electromagnetic interference radiation.

According to example embodiments, the second circuit board is disposed clamped between the intermediate flange and the main body, e.g., outside the first radial distance region. Thus, the second circuit board is held mechanically stable and the electronic components disposed on the second circuit board are protected from electromagnetic interference radiation.

According to example embodiments, the screw axis of the first screw is aligned coaxially to the axis of rotation of the rotor shaft. Thus, the permanent magnet located in the center of the screw head triggers exactly one pulse per rotation on the pulse wire sensor disposed on the second circuit board, so that a counter can determine the total number of rotations from the number of pulses and the direction of rotation.

According to example embodiments, the region covered in the axial direction by the screw head of the first screw and/or the region covered in the axial direction by the permanent magnet includes the region covered in the axial direction by the intermediate flange. Thus, the first screw protrudes through a recess in the intermediate flange, and the angle sensor, via the disk part with dimensional scale and with the second circuit board, can thus not only determine the angular position in fine resolution, but also the number of total rotations, by triggering a voltage pulse on the pulse wire sensor mounted on the first circuit board for each rotation of the first screw together with the permanent magnet.

According to example embodiments, the hood part and/or the main body is and/or are made of metal. Thus, improved heat removal and electromagnetic shielding can be achieved, as well as mechanical stability.

According to example embodiments, the intermediate flange and/or the holding part is or are made of metal. Thus, improved heat removal and electromagnetic shielding can be achieved.

Further features and aspects of example embodiments of the present invention are explained in more detail below with reference to the appended schematic FIGURE.

BRIEF DESCRIPTION OF THE DRAWINGS

FIG. 1 is a cross-sectional view of an angle sensor provided for an electric motor.

DETAILED DESCRIPTION

As illustrated in FIG. 1, the angle sensor has a part that is rotatably mounted relative to a stationary part and can be connected to the rotor of the electric motor for conjoint rotation. For example, a rotor shaft 1 of the angle sensor can be connected to the rotor of the electric motor or can be formed in one piece.

The electric motor has a stator housing relative to which the rotor is rotatably mounted.

A, e.g., pot-shaped main body 14 can be connected to the stator housing for conjoint rotation.

A hood part 6 is connected to the main body 14, which together with the main body 14 forms a housing of the angle sensor.

The hood part 6 is, e.g., made of metal, e.g., so that a high thermal conductivity is available.

The rotor shaft 1 has a bore, e.g., a threaded bore, on its end face facing the hood part 6, into which bore a screw 11 is screwed, the screw head of which presses a hollow shaft 13 against the rotor shaft 1, e.g., against the end face of the rotor shaft 1. In this manner, the hollow shaft 13 is connected to the rotor shaft 1 for conjoint rotation.

The bore axis of the bore is aligned coaxially, e.g., concentrically, to the axis of rotation of the rotor shaft 1.

A permanent magnet 10 is disposed in a recess, e.g., a depression, in the screw head, e.g., on the end face of the screw head facing away from the rotor shaft 1. The permanent magnet 10 serves as an encoder for detecting the integer rotations of the rotor shaft 1.

The hollow shaft 13 has a surface section which is flat and is disposed at a single axial position. The axial direction is aligned parallel to the axis of rotation of the rotor shaft 1.

For example, the hollow shaft 13 is arranged as a rotationally symmetrical part.

An annular disk part 12, e.g., a target disk, is attached to the surface section.

For this purpose, the disk part 12 has a centrally disposed, axially passing through hole through which a cylindrical section of the hollow shaft 13 protrudes. In this manner, the disk part 12 can be slid onto the cylindrical section of the hollow shaft 13 and can thus be precisely centered by the section in the radial direction. By placing it against the surface section and then connecting it, e.g., by connecting it to the hollow shaft 13 in material-locking manner, the disk part is aligned parallel to the flat surface section.

The disk part 12 is arranged as a target disk. For example, the disk part 12 has a dimensional scale which in an interactive manner enters into an operative connection with the conducting tracks of a circuit board 9 formed as coil windings.

The disk part 12 has ferromagnetic structures or coil windings as a dimensional scale, which are formed such that the inductive coupling to the coil windings of the circuit board 9 depends on the angular position of the disk part 12, thus allowing for determining the angular position of the disk part 12 relative to the circuit board 9 by determining the inductance of the coil windings.

The circuit board 9 rests on a projection of the main body 14 and is pressed against this projection by the intermediate flange 8. The intermediate flange 8 rests on the side of the circuit board 9 facing away from the projection.

The intermediate flange 8 is pressed against the main body 14 via screws whose screw head respectively presses on the intermediate flange 8 and is thus connected thereto.

On the side of the intermediate flange 8 facing away from the circuit board 9, a circuit board 7 of a signal electronics unit is placed.

A holding part 3 rests against the side of the circuit board 7 of the signal electronics facing away from the intermediate flange 8 and is pressed against the circuit board 7 by the screw head of a screw 15 passing through the holding part 3 and through the circuit board 7, which is thus pressed against the intermediate flange 8. The screw 15 is screwed into a threaded bore of the intermediate flange 8.

An electronic circuit 4, e.g., a rectifier, is disposed on the side of the holding part 3 facing away from the circuit board 7, which circuit is, e.g., cast with casting compound or has a module housing which encloses power semiconductors such as diodes, etc.

To remove the heat from the module housing, an elastically preloaded sheet-metal part 5 is disposed between the module housing and the hood part 6. Since this sheet-metal part 5 touches both the module housing and the hood part 6, a heat flow from the module housing to the hood part 6 is removed in improved manner.

The signal electronics are electrically connected to the conducting tracks of the circuit board 9 and detect the inductive coupling and/or inductance of the conducting tracks of the circuit board 9, which are arranged as coil windings, in order to determine the angular position.

The electronic circuit 4 is provided for supplying a coil of an electromagnetically actuated brake. For this purpose, the circuit has a rectifier which is cooled via the sheet-metal part 5 and the hood part 6. In addition, the electronic circuit 4 has a controllable semiconductor switch which controls the energy supplied to the coil by the rectifier, i.e., causes the coil to be energized or de-energized. The control signal of the controllable semiconductor switch is generated by the signal electronics on the circuit board 7, e.g., depending on a data interface, which is disposed on the circuit board 7 and is suitable for data transmission between the signal electronics and an inverter feeding the electric motor.

The sensor signals of the angle sensor, e.g., the detected angular position of the rotor, are transmitted from the circuit board 7 to the inverter, and the control signals for the controllable semiconductor switch and thus for the electromagnetically actuated brake are transmitted from the inverter via the signal electronics to the electronic circuit 4.

A magnetic field sensor, e.g., a Wiegand sensor and/or Hall sensor, is also fitted on the circuit board 7 so that the angular position of the permanent magnet can also be detected or at least an electrical voltage pulse can be generated for each rotation. In this manner, a voltage pulse can be generated per rotation of the rotor with a pulse wire sensor, e.g., a Wiegand sensor, fitted on the circuit board 7, so that the total number of rotations of the rotor can be readily determined by counting the pulses, e.g., via a counter of the signal electronics.

Since the intermediate flange 8 is disposed axially between the circuit board 7 of the signal electronics and the circuit board 9 with energized conducting tracks and is made of metallic material, heat can be removed from the two circuit boards to the main body 14 via the intermediate flange 8.

Heat can also be removed from the holding part 3, which is disposed axially between the electronic circuit and the signal electronics, via the screw 15 to the intermediate flange 8 and from there to the main body 14.

In addition, the metallic parts, such as the intermediate flange 8 and the holding part 3, shield electromagnetic radiation so that no mutual interference of the signal electronics, the electronic circuit, and the measured value acquisition is caused by the circuit board 9.

The stack structure, e.g., the stacked structure of the angle sensor, thus provides for efficient cooling with improved shielding against interfering radiation.

A bearing 3 is accommodated in the main body 14, via which the rotor shaft 1 is rotatably mounted. This means that the rotor in the electric motor is rotatably mounted via two bearings, and the rotor shaft 1, which is connected to the rotor for conjoint rotation, is rotatably mounted via bearing 2.

The holding part 3 has a greater axial wall thickness on its radially outer region than radially on the inside. The intermediate flange 8 also has a greater axial wall thickness in the radially outer region than further inwards. A recess in the holding part 3 faces a recess in the intermediate flange 8 such that the signal electronics 7 are disposed in the interior which is thus surrounded by the holding part 3 together with the intermediate flange 8.

This means that the signal electronics are enclosed, on the one hand, and, on the other hand, are cooled as efficiently as possible in all directions.

The circuit board 7 is clamped between the intermediate flange 8 and the holding part 3, e.g., in the radially outer region.

For example, the signal electronics are adapted to determine the angular position of the rotor shaft 1, e.g., the electrical connection with the second circuit board 9, e.g., with the conducting tracks arranged as coil windings, is necessary for this purpose.

The signal electronics also have a data interface via which data can be exchanged with an inverter feeding the electric motor, e.g., of a converter. The inverter provides the stator winding of the electric motor with a three-phase voltage, in which the three-phase voltage is provided by the inverter such that an actual value of the angular position of the rotor shaft is regulated to a setpoint value. The inverter has a controller for this purpose, to which the angular position of the rotor shaft determined by the angle sensor is fed as angular information. To control the brake, corresponding control information is transmitted from the inverter via the data interface to the signal electronics, which filters this control information out of the data stream received via the data interface and forwards it to the electronic circuit. The electronic circuit energizes the coil of the electromagnetically actuated brake depending on this control information. For example, the coil of the brake is energized or not energized.

When the coil is energized, a ferromagnetic armature plate is pulled towards the coil against the spring elements supported on a magnet body of the brake. The coil is inserted in a recess in the magnet body.

When the coil is not energized, the armature plate is pressed away from the coil by the spring elements so that the armature plate is pressed onto a brake pad carrier, which is fastened to the rotor for conjoint rotation and can be moved in an axial direction. For this purpose, the brake pad carrier has an internal toothing which meshes with the external toothing of a ring-like tappet which is slid on to the rotor and connected therewith for conjoint rotation, e.g., via a key connection.

Thus, the brake pad carrier is then pressed by the armature plate onto a braking face, which is, for example, formed on a bearing flange of the housing of the electric motor. When energized, however, the brake pad carrier is released, since the armature plate is pulled away from the brake pad carrier towards the magnet body. The armature plates are located axially between the magnet body and the brake pad carrier. The brake pad carrier is located axially between the braking face and the armature plate.

For example, the brake has diagnostic device(s), for example, a temperature sensor for capturing the temperature of the magnetic body and/or a sensor for capturing the brake pad thickness of the brake pad carrier, so that wear of the brake pad can be detected at an early stage. The signals from the one or more diagnostic device(s) are fed to the electronic circuit and from there to the signal electronics and from there via the interface to the inverter, e.g., the converter. The inverter is configured such that the control information is generated by the inverter depending on the signals from the one or more diagnostic means.

If, for example, the temperature of the brake, e.g., of the magnet body and thus the coil of the brake, is too high or the brake pad exceeds a critical amount of wear, the brake is no longer released but remains applied. The control of the brake is thus carried out depending on the diagnostic signals, e.g., depending on the diagnostic information.

The electronic circuit can thus be controlled by the inverter, and the control information is transmitted from the inverter via the interface of the signal electronics and then from the signal electronics to the electronic circuit. This latter transmission is carried out either via a plug connector between the first and second circuit boards 7 and 9 or via a non-contact interface, e.g., a radio communication interface and/or near-field communication interface.

The circuit board 9, which, for example, has the coil windings acting as measuring coils, is clamped between the main body 14 and the intermediate flange 8, especially in the radially outer region. However, the circuit board 9 is centered on the hollow shaft 13 during the manufacture of the angle sensor, before it is clamped between the main body 14 and the intermediate flange 8.

For example, the disk part 12 is arranged as a circuit board and can thus be manufactured in cost-effective manner.

LIST OF REFERENCE NUMERALS

1 Rotor shaft
2 Bearing
3 Holding part, e.g., holder
4 Electronic circuit, e.g., rectifier
5 Sheet-metal part
6 Hood part
7 Circuit board of signal electronics
8 Intermediate flange

9 Circuit board with conducting tracks formed as coils
10 Permanent magnet
11 Screw
12 Disk part, e.g., target disk
13 Hollow shaft
14 Main body, e.g., pot-shaped main body
15 Screw

The invention claimed is:

1. A drive system, comprising:

an electric motor with an angle sensor and an inverter adapted to feed the electric motor;

wherein the angle sensor includes and/or at least partially encloses within a housing of the angle sensor:

a rotor shaft;

an electronic circuit;

signal electronics including a first circuit board and a data interface;

a second circuit board;

a disk part; and a hollow shaft, wherein the rotor shaft of the angle sensor is connected for conjoint rotation with a rotor of the electric motor;

wherein the disk part is connected with the hollow shaft for conjoint rotation;

wherein the second circuit board includes conducting tracks arranged and/or formed as coil winding;

wherein the electric motor includes an electromagnetically actuated brake having a coil connected to the electronic circuit via an electrical cable, the electronic circuit being adapted to supply and/or feed the coil winding electrically depending on a control signal and/or depending on control information;

wherein the signal electronics include a filter adapted to filter out the control signal and/or the control information from data transmitted from the inverter to the signal electronics via the data interface and to feed the control signal and/or the control information to the electronic circuit; and wherein the data interface is adapted for bidirectional data transmission and is adapted to transmit values of an angular position of the rotor shaft captured by the angle sensor from the signal electronics to the inverter.

2. The drive system according to claim 1, wherein the disk part includes a dimensional scale, the rotor shaft of the angle sensor is arranged integral with the rotor, and the angle sensor is arranged within a housing of the electric motor, the conducting tracks are in operative connection with the dimensional scale of the disk part, and the filter is arranged on the first circuit board.

3. The drive system according to claim 1, wherein the angle sensor includes a main body, a hood part, a holding part, and an intermediate flange, the disk part being arranged on the hollow shaft and/or arranged on the hollow shaft without play to center the disk part in a radial direction, and bearing against a shaft step, a flat surface region of the hollow shaft, and/or a flat surface region of the hollow shaft arranged at a single axial position, the second circuit board including being clamped between the main body and the intermediate flange, the intermediate flange being pressed towards the main body by a screw head of a screw screwed into a threaded bore of the main body, the first circuit board being clamped between the intermediate flange and the holding part, a screw head of a screw screwed into a threaded bore of the intermediate flange pressing the holding part toward the intermediate flange, an elastically preloaded sheet-metal part supported on the hood part being arranged between the holding part and the hood part.

4. The drive system according to claim 3, wherein the electronic circuit is arranged on a side of the holding part facing away from the first circuit board and/or between the hood part and the holding part, and the sheet-metal part is supported on the electronic circuit and/or is arranged elastically preloaded between the electronic circuit and the hood part.

5. The drive system according to claim 4, wherein the sheet-metal part is arranged as a bent part.

6. The drive system according to claim 3, wherein the disk part covers a first radial distance region, the hollow part has an axially greater thickness radially outside the first radial distance region than in the first radial distance region, and/or the intermediate flange has an axially greater thickness radially outside the first radial distance region than in the first radial distance region.

7. The drive system according to claim 3, wherein the first circuit board is clamped between the hollow shaft and the intermediate flange.

8. The drive system according to claim 3, wherein the second circuit board is clamped between the intermediate flange and the main body.

9. The drive system according to claim 3, wherein the hood part and/or the main body is made of metal.

10. The drive system according to claim 3, wherein the intermediate flange and/or the holding part is made of metal.

11. The drive system according to claim 1, wherein the brake includes at least one diagnostic device adapted to capture a value of at least one state variable of the brake, the diagnostic device being electrically connected to the electronic circuit such that the captured values are transmittable from the diagnostic device to the electronic circuit, the electronic circuit being connected to the signal electronic and/or to the first circuit board such that the captured values are forwardable from the electronic circuit to the signal electronics and from the data interface to the inverter.

12. The drive system according to claim 11, wherein the inverter is adapted to generate the control signal and/or the control information depending on the values captured by the diagnostic device.

13. The drive system according to claim 11, wherein the state variable includes a temperature of the brake and/or a wear condition of a brake pad of the brake.

14. The drive system according to claim 13, wherein the diagnostic device includes a temperature sensor and/or a sensor adapted to capture the wear condition of the brake pad of the brake.

15. The drive system according to claim 1, wherein the rotor is rotatably mounted via two bearings accommodated in a housing of the electric motor.

16. The drive system according to claim 15, wherein the housing of the electric motor includes a stator housing and two bearing flanges spaced apart from one another, each bearing flange being connected to the stator housing, in each bearing flange, a respective one of the two bearings being accommodated.

17. The drive system according to claim 1, wherein a screw head of a first screw screwed into a threaded hole in the rotor shaft presses the hollow shaft against the rotor shaft, a permanent magnet being accommodated in the screw head of the first screw and/or a center of gravity of the permanent magnet being arranged in an axis of rotation of the hollow shaft.

18. The drive system according to claim 17, wherein the first circuit board includes a magnetic field-sensitive sensor, a pulse wire sensor, and/or a Wiegand sensor in operative connection with the permanent magnet.

19. The drive system according to claim 18, wherein a counter mounted on the first circuit board and adapted to determine a number of rotations of the rotor shaft is electrically suppliable by the sensor.

20. The drive system according to claim 17, wherein a screw axis of the first screw is aligned coaxially to an axis of rotation of the rotor shaft.

21. The drive system according to claim 17, wherein a region covered in an axial direction by the screw head of the first screw and/or a region covered in the axial direction by the permanent magnet includes a region covered in the axial direction by the intermediate flange.

22. The drive system according to claim 1, wherein conducting tracks of the second circuit board, arranged formed as coil windings, are in operative connection with a dimensional scale of the disk part and the signal electronics are electrically connected to the coil windings and are adapted to determine an angular position of the disk part in relation to the second circuit board.

23. The drive system according to claim 1, wherein the electronic circuit is arranged in a casting compound and/or in a housing.

* * * * *